(12) United States Patent
Ryu et al.

(10) Patent No.: US 11,022,841 B2
(45) Date of Patent: Jun. 1, 2021

(54) BACKLIGHT UNIT AND DISPLAY DEVICE

(71) Applicant: LG Display Co., Ltd., Seoul (KR)

(72) Inventors: SangChul Ryu, Gyeongsangbuk-do (KR); DongSeok Lee, Gyeonggi-do (KR); MyungJoon Park, Gyeonggi-do (KR); Suhun Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/702,882

(22) Filed: Dec. 4, 2019

(65) Prior Publication Data
US 2020/0183230 A1 Jun. 11, 2020

(30) Foreign Application Priority Data
Dec. 7, 2018 (KR) .................. 10-2018-0156878

(51) Int. Cl.
*G02F 1/13357* (2006.01)
*F21V 8/00* (2006.01)
*G02F 1/1335* (2006.01)

(52) U.S. Cl.
CPC ..... *G02F 1/133605* (2013.01); *G02B 6/0038* (2013.01); *G02F 1/133512* (2013.01)

(58) Field of Classification Search
None
See application file for complete search history.

(56) References Cited

U.S. PATENT DOCUMENTS

| | | | | |
|---|---|---|---|---|
| 7,894,014 B2* | 2/2011 | Kawase | ............ | G02F 1/133603 349/58 |
| 8,403,511 B2* | 3/2013 | Bae | ............... | G02B 6/0078 362/97.1 |
| 10,698,260 B2* | 6/2020 | Kim | ............... | G02F 1/133606 |
| 2011/0051412 A1* | 3/2011 | Jeong | ............... | G02F 1/133603 362/235 |
| 2011/0170020 A1* | 7/2011 | Kasai | ............... | G02B 6/008 348/739 |
| 2011/0199787 A1* | 8/2011 | Kim | ............... | G02B 6/0023 362/612 |
| 2011/0205451 A1* | 8/2011 | Yoshikawa | ............. | H04N 5/64 348/739 |
| 2011/0249215 A1* | 10/2011 | Jung | ............... | G02F 1/133611 349/61 |
| 2012/0087122 A1* | 4/2012 | Takeuchi | ........... | G02F 1/133605 362/235 |
| 2016/0109089 A1* | 4/2016 | Chae | ............... | G02F 1/133608 349/64 |
| 2017/0315408 A1* | 11/2017 | Lee | ............... | G02F 1/133611 |
| 2020/0249530 A1* | 8/2020 | He | ............... | G02F 1/133603 |

* cited by examiner

*Primary Examiner* — Jong-Suk (James) Lee
*Assistant Examiner* — Eric T Eide
(74) *Attorney, Agent, or Firm* — Polsinelli PC

(57) ABSTRACT

A backlight unit for a display device comprises a plurality of light sources; a printed circuit including a first area where the plurality of light sources are disposed and a second area horizontally extended from the first area where no light source is disposed; at least one reflection plate disposed between the plurality of light sources in the first area; a light source protection portion covering the plurality of light sources and the reflection plate in the first area; and a printed circuit protection portion disposed on a side surface of the light source protection portion located at a boundary between the first and second areas and extended to an exposed surface of the printed circuit in the second area.

17 Claims, 11 Drawing Sheets

BACKLIGHT UNIT AND DISPLAY DEVICE

CROSS REFERENCE TO RELATED APPLICATION

This application claims priority from Korean Patent Application No. 10-2018-0156878, filed on Dec. 7, 2018, which is hereby incorporated by reference in its entirety.

BACKGROUND OF THE DISCLOSURE

Field of the Disclosure

The present disclosure relates to a display device, and more particularly, to a backlight unit and a display device. Although the present disclosure is suitable for a wide scope of applications, it is particularly suitable for preventing hot spots and improving image quality while reducing a thickness of the backlight unit for the display device.

Description of the Background

As the information society develops, the demand for display devices for displaying images is increasing in various ways. Display devices such as a liquid crystal display device (LCD) and an organic light emitting display device (OLED) have been used for this purpose.

Among these display devices, the liquid crystal display device includes a display panel and a light source device such as a backlight unit that supplies light to the display panel.

For example, the backlight unit may be of an edge-type in which the light source is disposed on the side of the backlight unit and light is supplied to the display panel through the light guide plate, and a direct-type in which the light source is disposed at a lower portion of the backlight unit and light is supplied in a vertical direction.

Here, the direct-type backlight unit may have a larger amount of light to be supplied to the display panel than the edge-type backlight unit. However, there may be a disadvantage that the direct-type backlight unit may be thick due to the arrangement position of the light source, an optical gap between the light source and an optical sheet included in the backlight unit, and the like.

Therefore, there may be a problem that the thickness of the display device including the direct-type backlight unit increases, and in the case that the thickness of the backlight unit is reduced, there may be a problem that the image quality may be lowered due to the reduction of the optical gap.

SUMMARY

Accordingly, the present disclosure is directed to a back light unit and a display device that substantially obviates one or more of problems due to limitations and disadvantages of the prior art.

Additional features and advantages of the disclosure will be set forth in the description which follows and in part will be apparent from the description, or may be learned by practice of the invention. Other advantages of the present disclosure will be realized and attained by the structure particularly pointed out in the written description and claims hereof as well as the appended drawings.

An aspect of the present disclosure is to provide a backlight unit and a display device capable of preventing hot spots and improving image quality while reducing the thickness of the backlight unit.

Another aspect the present disclosure is to provide a backlight unit and a display device capable of easily arranging a structure for increasing efficiency of light emitted from the light source on the light source.

Another aspect of the present disclosure is to provide a backlight unit and a display device capable of preventing contamination of a printed circuit mounted with the light source and preventing a defect caused by contamination of the printed circuit in arranging the structure for increasing light efficiency on the light source.

In accordance with an aspect of the present disclosure, a backlight unit for a display device comprises a plurality of light sources; a printed circuit including a first area where the plurality of light sources are disposed and a second area horizontally extended from the first area where no light source is disposed; at least one reflection plate disposed between the plurality of light sources in the first area; a light source protection portion covering the plurality of light sources and the reflection plate in the first area; and a printed circuit protection portion disposed on a side surface of the light source protection portion located at a boundary between the first and second areas and extended to an exposed surface of the printed circuit in the second area.

In another aspect of the present disclosure, a backlight unit comprises a plurality of light sources; a printed circuit having a first area in which the plurality of light sources are disposed and a second area located outside the first area; a reflection plate disposed in at least one area between the plurality of light sources arranged in the first area; a light source protection portion disposed on the plurality of light sources and the reflection plate in the first and; and a printed circuit protection portion disposed on a side surface of the light source protection portion and the second area of the printed circuit and surrounding at least a part of aside surface of the printed circuit, wherein the printed circuit protection portion comprising a first protection portion made of a first resin; and a second protection portion disposed inside the first protection portion and made of a second resin.

In a further aspect of the present disclosure a display device comprises a display panel that displays an image; and a backlight unit that supplies light to the display panel, wherein the backlight unit comprises a printed circuit having a first area and a second area; a plurality of light sources arranged in the first area; a reflection plate disposed in at least one area between the plurality of light sources arranged in the first area; a light source protection portion disposed on the plurality of light sources and the reflection plate in the first area; and a printed circuit protection portion disposed on a side surface of the light source protection portion and the second area of the printed circuit, and the printed circuit protection portion surrounding at least a part of a side surface of the printed circuit, wherein the printed circuit protection portion comprises a first protection portion made of a first resin; and a second protection portion disposed between the first protection portion and the side surface of the light source protection portion and made of a second resin.

The backlight unit may include a printed circuit protection portion disposed on a side surface of the light source protection portion and the second area of the printed circuit and surrounding at least a part of the side surface of the printed circuit.

The printed circuit protection portion may include a first protection portion made of a first kind of resin, and a second protection portion disposed between the first protection portion and the side surface of the light source protection portion and made of a second kind of resin.

In this backlight unit, the second protection portion may be further disposed between the first protection portion and the printed circuit.

The light source protection portion may be made of resin of the same kind as the second protection portion.

The portion disposed on the side surface of the light source protection portion in the printed circuit protection portion may include at least one groove recessed from the upper side in a direction perpendicular to the printed circuit.

In accordance with another aspect of the present disclosure, there may be provided with a display device comprising a display panel and the backlight unit as above for supplying light to the display panel.

According to the aspects of the present disclosure, it is possible to maintain the image quality of the backlight unit and reduce the thickness of the backlight unit by arranging the light source protection portion for diffusing the light emitted from the light source and the light shielding sheet for shielding the light of the specific area on the light source.

According to the aspects of the present disclosure, the printed circuit protection portion comprising the partition structure having the inner side made of resin of the same kind as the light source protection portion is arranged in an area where the light source is not arranged in the printed circuit so that the light source protection portion can be easily arranged on the light source mounted on the printed circuit.

In addition, according to the aspects of the present disclosure, the outer surface of the printed circuit protection portion is made of a resin of a different kind from the resin constituting the light source protection portion so that the printed circuit may be prevented from being contaminated in the process of arranging the light source protection portion and the defect of the backlight unit due to contamination of the printed circuit can be prevented.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
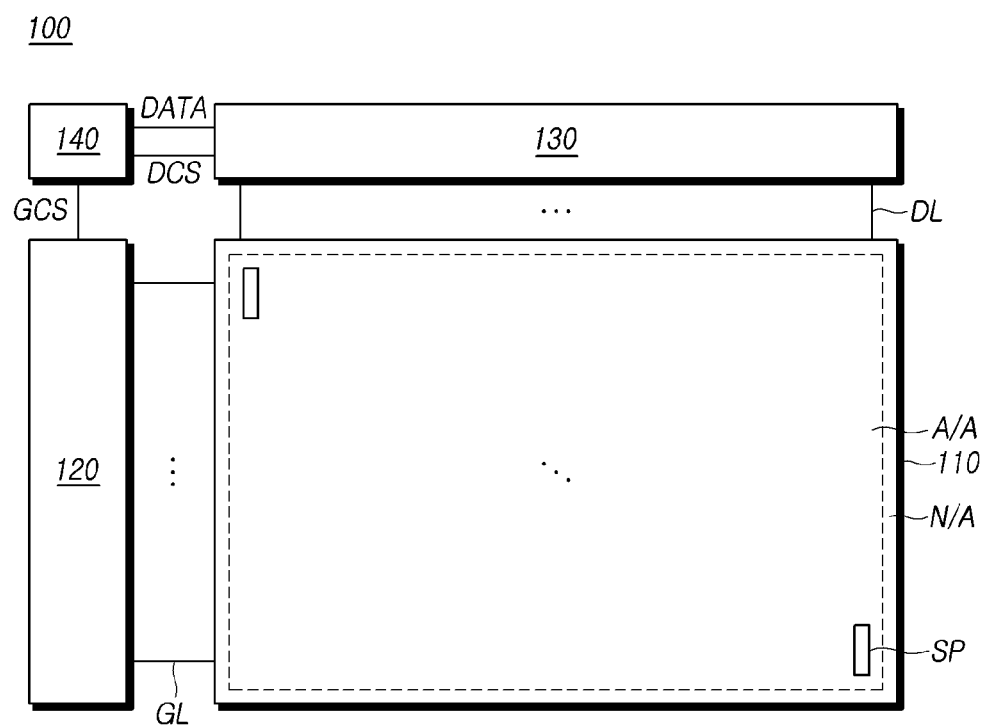
FIG. 1 is a diagram illustrating a schematic configuration of the display device according to aspects of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram illustrating a schematic configuration of the display device 100 according to aspects of the present disclosure.

Referring to FIG. 1, the display device 100 according to the aspects of the present disclosure may include a display panel 110 having an active area (A/A) and a non-active area (N/A), a gate driving circuit 120 for driving the display panel 110, a data driving circuit 130, a controller 140, and the like.

A plurality of gate lines (GL) and a plurality of data lines (DL) are arranged in the display panel 110 and subpixels (SP) are arranged in the area in which the gate lines (GL) and the data lines (DL) intersect each other.

The gate driving circuit 120 may be controlled by the controller 140 and may sequentially output a scan signal to the plurality of gate lines (GL) arranged on the display panel 110 to control the driving timing of the plurality of subpixels (SP).

The gate driving circuit 120 may include at least one gate driver integrated circuit (GDIC), and may be located on one side or both sides of the display panel 110 according to the driving manner.

Each gate driver integrated circuit (GDIC) may be connected to the bonding pad of the display panel 110 by a tape automated bonding (TAB) method or a chip on glass (COG) method. Alternatively, each gate driver integrated circuit (GDIC) may be implemented as a gate-in-panel (GIP) type and directly disposed on the display panel 110, or may be integrated on the display panel 110. In addition, each gate driver integrated circuit (GDIC) may be implemented by a chip on film (COF) method, which is mounted on a film connected to the display panel 110.

The data driving circuit 130 may receive the image data from the controller 140 and may convert the image data into an analog data voltage. The data voltages may be outputted to the respective data lines (DL) in accordance with the timing of the scan signals applied through the gate lines (GL) so that each subpixel (SP) expresses the brightness according to the image data.

The data driving circuit 130 may include one or more source driver integrated circuits (SDICs).

Each source driver integrated circuit (SDIC) may include a shift register, a latch circuit, a digital-to-analog converter, an output buffer, and the like.

Each source driver integrated circuit (SDIC) may be connected to a bonding pad of the display panel 110 by a tape automated bonding (TAB) method or a chip on glass (COG) method. Alternatively, each source driver integrated circuit (SDIC) may be directly disposed on the display panel 110, or may be integrated and disposed on the display panel 110 depending on the case. In addition, each source driver integrated circuit (SDIC) may be implemented in a chip-on-film (COF) manner, and in this case, each source driver integrated circuit (SDIC) may be mounted on a film connected to the display panel 110 and may be electrically connected to the display panel 110 through lines on the film.

The controller 140 may supply several control signals to the gate driving circuit 120 and the data driving circuit 130 and may control the operations of the gate driving circuit 120 and the data driving circuit 130.

The controller 140 may be mounted on a printed circuit board, a flexible printed circuit, or the like, and electrically connected to the gate driving circuit 120 and the data driving circuit 130 through the printed circuit board, the flexible printed circuit, or the like.

The controller 140 may control the gate driving circuit 120 to output the scan signal in accordance with the timing to be implemented in each frame, and may convert the image data received from the outside in accordance with the data signal format used by the data driving circuit 130, and may output the converted image data to the data driving circuit 130.

The controller 140 may receive several timing signals including a vertical synchronizing signal (VSYNC), a horizontal synchronizing signal (HSYNC), an input data enable signal (DE), a clock signal (CLK) in addition to the image data from the outside (e.g., the host system).

The controller 140 may generate various control signals using timing signals received from the outside, and may output the control signals to the gate driving circuit 120 and the data driving circuit 130.

For example, in order to control the gate driving circuit 120, the controller 140 may output various gate control signals (GCS) including a gate start pulse (GSP), a gate shift clock (GSC), a gate output enable signal (GOE) and the like.

Here, the gate start pulse (GSP) may control the operation start timing of one or more gate driver integrated circuit (GDIC) constituting the gate driving circuit 120. The gate shift clock (GSC) is a clock signal commonly input to one or more gate driver integrated circuits (GDIC), and controls the shift timing of the scan signal. The gate output enable signal (GOE) may specify the timing information of one or more gate driver integrated circuits (GDICs).

In order to control the data driving circuit 130, the controller 140 may output various data control signals (DCS) including a source start pulse (SSP), a source sampling clock (SSC), a source output enable signal (SOE), and the like.

Here, the source start pulse (SSP) controls the data sampling start timing of one or more source driver integrated circuits (SDIC) constituting the data driving circuit 130. The source sampling clock (SSC) is a clock signal for controlling the sampling timing of data in each of the source driver integrated circuits (SDIC). The source output enable signal (SOE) controls the output timing of the data driving circuit 130.

The display device 100 may further include a power management integrated circuit (not shown) capable of supplying various voltages or currents to the display panel 110, the gate driving circuit 120, and the data driving circuit 130 or capable of controlling various voltages or currents to be supplied.

Each of the subpixels (SP) may be defined by the intersection of the gate line (GL) and the data line (DL), and the liquid crystal or the light emitting element may be disposed in each subpixel depending on the type of display device 100.

For example, in the case that the display device 100 is a liquid crystal display device, the liquid crystal display device may include a light source device such as a backlight unit that emits light to the display panel 110, and the liquid crystal may be arranged in the subpixel of the display panel 110. Also, the image can be displayed indicating the brightness according to the image data by adjusting the arrangement of the liquid crystal by the electric field formed by the data voltage applied to each subpixel (SP).

Here, the backlight unit may be disposed below the display panel 110 to supply light to the display panel 110.

Figure 2:
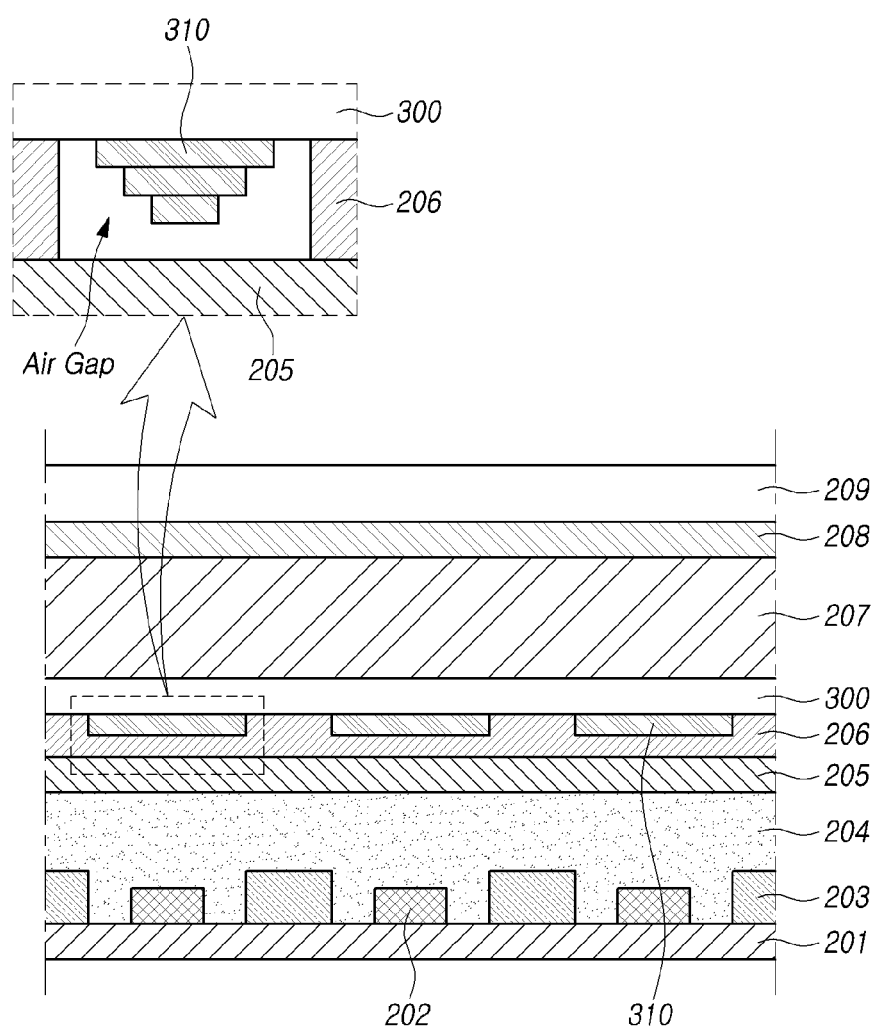
FIG. 2 is a diagram illustrating an example of the structure of the backlight unit included in the display device according to aspects of the present disclosure.

FIG. 2 is a diagram illustrating an example of the structure of the backlight unit included in the display device 100 according to aspects of the present disclosure.

Referring to FIG. 2, the backlight unit may include a plurality of light sources 202 and a plurality of optical elements or optical sheets.

The plurality of light sources 202 may be disposed on the printed circuit 201, and the printed circuit 201 may be in the form of a substrate.

The light source 202 may be, for example, a light emitting diode (LED), a mini LED, or a micro LED (μLED). Therefore, the light source 202 having a chip shape can be disposed on the printed circuit 201, so that the thickness of the backlight unit can be reduced.

The light source 202 may emit light in a white wavelength band or, in some cases, light in a specific wavelength band (e.g., a blue wavelength band).

The reflection plate 203 may be disposed on at least a part of the area except the region where the light source 202 is disposed on the printed circuit 201.

The reflection plate 203 may be formed in a shape in which a region corresponding to the light source 202 is opened, and may be placed on the printed circuit 201. The reflection plate 203 reflects the light emitted from the light source 202 to the front surface of the backlight unit, thereby enhancing the light efficiency of the backlight unit.

Here, when the light source 202 is arranged in the form of a chip, the height of the reflection plate 203 may be greater than the height of the light source 202 since the size of the light source 202 is small.

Therefore, the light emitted in the lateral direction of the light source 202 can be reflected by the side surface of the reflection plate 203 and emitted to the front surface of the backlight unit, thereby further increasing the light efficiency of the backlight unit.

In addition, in some cases, the reflection film coated on the printed circuit 201 may be arranged.

That is, the reflection film may be coated on the entire surface of the printed circuit 201 or in an area except a region where the light source 202 is disposed, thereby enhancing light efficiency.

In this case, the reflection film coated on the printed circuit 201 may replace the function of the reflection plate 203, or the reflection plate 203 may be disposed together to provide a reflection function.

The light source protection portion 204 may be disposed on the plurality of light sources 202 and the reflection plate 203.

The light source protection portion 204 may be made of, for example, a silicone resin or a resin.

In the case that the light source protection portion 204 is made of the resin, a partition or barrier rib may be disposed outside the printed circuit 201 or on an outer area of a region where the plurality of light sources 202 are arranged on the printed circuit 201. In addition, the light source protection portion 204 may be formed by applying the resin to the inside of the partition.

The light source protection portion 204 may provide the function of protecting the plurality of light sources 202 disposed on the printed circuit 201 and of diffusing the light emitted from the light source 202 to serve the function of the light guide plate.

That is, the light emitted from the light source 202 can be spread evenly over the upper surface of the light source protection portion 204 by using light source protection portion 204.

The protection film 205 may be disposed on the light source protection portion 204.

At this case, even if the direction of the light is controlled by the reflection plate 203 or the light source protection portion 204, the intensity of light emitted in the vertical direction of the light source 202 may be large, thus the uniformity of the image may be lowered.

Aspects of the present disclosure can improve the uniformity of the image while reducing the thickness of the backlight unit by arranging the light shielding pattern 310 at the position corresponding to the light source 202 on the light source protection portion 204.

For example, the light shielding sheet 300 may be disposed on the protection film 205. A plurality of light shielding patterns 310 may be disposed on the lower surface of the light shielding sheet 300. Alternatively, the plurality of light shielding patterns 310 may be disposed on the upper surface of the light shielding sheet 300.

The light shielding sheet 300 may be adhered onto the light source protection portion 204 through the adhesive layer 206. The light shielding sheet 300 may be made of PET or the like, but is not limited thereto.

Each of the plurality of light shielding patterns 310 disposed on the lower surface of the light shielding sheet 300 may be disposed to correspond to each of the plurality of light sources 202 disposed on the printed circuit 201.

That is, at least a part of the light shielding pattern 310 may be arranged to overlap the light source 202, and in consideration of the diffusion characteristics of the light, the light shielding pattern 310 may be arranged to overlap the area including the area where the light source 202 is disposed.

The light shielding pattern 310 may scatter or reflect light emitted from the light source 202.

For example, the light shielding pattern 310 may scatter light emitted in the vertical direction from the light source 202 to allow light to be emitted in a vertical direction and an oblique direction. Alternatively, the light emitted from the light source 202 in the vertical direction may be reflected between the light shielding pattern and the reflection plate 203, and light may be emitted to a region between the light sources 202.

That is, by arranging the light shielding pattern 310 in the region where the intensity of the light emitted from the light source 202 is strongest, it is possible to reduce the luminance deviation and the like between the area where the light source 202 is disposed (the region having a large amount of light) and the area between the light sources 202 (the region having a small amount of light).

Also, it is possible to prevent hot spot from occurring in the region where the light source 202 is arranged by blocking the light in the area where the light intensity is strongest.

The light shielding pattern 310 may be formed by printing a material with a light shielding characteristic on the light shielding sheet 300. For example, the light shielding pattern 310 may be formed by printing a TiO2 ink on the light shielding sheet 300.

The light shielding patterns 310 disposed on the lower surface of the light shielding sheet 300 may be arranged in one layer or may be arranged in a multilayer structure.

That is, as illustrated in FIG. 2, the light shielding pattern 310 disposed on the lower surface of the light shielding sheet 300 may be constituted of three layers.

The light shielding pattern 310 may be implemented by printing the light shielding material three times on the light shielding sheet 300, and the area of the light shielding material to be printed may be gradually narrowed. The light shielding sheet 300 on which the light shielding pattern 310 is disposed may be turned upside down and placed on the light source protection portion 204 so as to dispose the light shielding pattern 300 on the light source 202.

Therefore, the area of the light shielding pattern 310 may gradually become narrower toward the bottom of the light shielding pattern 300, and the thickness of the central portion of the light shielding pattern 310 may be larger than the thickness of the outer portion.

That is, since the intensity of light emitted in the vertical direction from the light source 202 is greatest, the central portion of the light shielding pattern 310 may be arranged thicker.

By arranging the light shielding pattern 310 on the light source 202 as described above, the light emitted from the light source 202 in the vertical direction may be blocked and it is possible to prevent the hot spot from occurring in the region where the light source 202 is disposed.

The light shielding sheet 300 on which the light shielding pattern 310 is disposed may be adhered on the protection film 205 by the adhesive layer 206.

At this case, the adhesive layer 206 may be disposed on at least a part of the area of the lower surface of the light shielding sheet 300 excluding the area where the light shielding pattern 310 is disposed.

Therefore, the adhesive layer 206 may not be disposed in the area where the shielding pattern 310 is disposed, and an air gap may exist between the shielding pattern 310 and the protection film 205.

The side portion of the light shielding pattern 310 and the adhesive layer 206 may be separated from each other.

Since the air gap exists between the shielding pattern 310 and the protection film 205, the light emitted in the lateral direction of the shielding pattern 310 may be reflected by the air gap.

That is, the light emitted in the lateral direction of the light shielding pattern 310 may be emitted at a large refraction angle by the air layer having a low refractive index, or may be reflected at the air layer. The light reflected by the air layer may be reflected and emitted by the reflection plate 203 again, thereby enhancing the light efficiency while assisting the light shielding function of the light shielding pattern 310.

As described above, the light efficiency of the backlight unit can be increased while preventing the hot spot by using the structure in which the light shielding pattern 310 and the air gap are disposed at the positions corresponding to the light source 202.

The diffusion plate 207 may be disposed on the light shielding sheet 300 and the phosphor sheet 208 may be disposed on the diffusion plate 207. Also, one or more optical sheets 209 may be disposed on the phosphor sheet 208.

Here, the positions where the diffusion plate 207 and the phosphor sheet 208 are disposed may be mutually exchanged.

The diffusion plate 207 may diffuse the light emitted through the light shielding sheet 300.

The phosphor sheet 208 may emit light in a specific wavelength band in response to incident light.

For example, when the light source 202 emits light of a first wavelength band (for example, blue light), the phosphor sheet 208 may emit light of a second wavelength band (for example, green Light) and light in the third wavelength band (for example, red light).

The phosphor sheet 208 may be disposed only in a part of the area on the diffusion plate 207.

For example, when the light source 202 emits light in the blue wavelength band, the phosphor sheet 208 may be formed only in the area except the region corresponding to the region where the blue subpixels (SP) are disposed in the display panel 110. That is, light that has not passed through the phosphor sheet 208 can reach the blue subpixel (SP) of the display panel 110.

The phosphor sheet 208 may not be arranged depending on the light source 202.

For example, when the light source 202 emits light in the white wavelength band, or when a fluorescent material that emits light in the green wavelength band and light in the red wavelength band is coated on the emission surface of the light source 202 that emits light in the blue wavelength band, the phosphor sheet 208 may not be disposed.

As described above, the aspects of the present disclosure include the light shielding sheet 300 including the light shielding pattern 310 disposed at the position corresponding to the light source 202, and various optical elements or optical sheets, so that the image quality of the backlight unit can be improved while reducing the thickness of the backlight unit.

In this backlight unit, the light source protection portion 204 disposed on the light source 202 may not be uniformly arranged in the outer area. That is, since the partitions are disposed on the printed circuit 201 and the inner side of the partition is coated with resin or the like, the light source protection portion 204 may be unevenly disposed in the region adjacent to the barrier ribs.

If the amount of the applied resin is increased in order to increase the uniformity of the light source protection portion 204, the resin may remain on the outside of the partitions and the printed circuit 201 may be contaminated and defective of the backlight unit may occur.

Aspects of the present disclosure may provide the method capable of increasing the uniformity of the light source protection portion 204 disposed on the light source 202 and of preventing the outer region of the region where the light source 202 is disposed in the printed circuit 201 from being contaminated and preventing defects due to such contamination.

Figure 3:
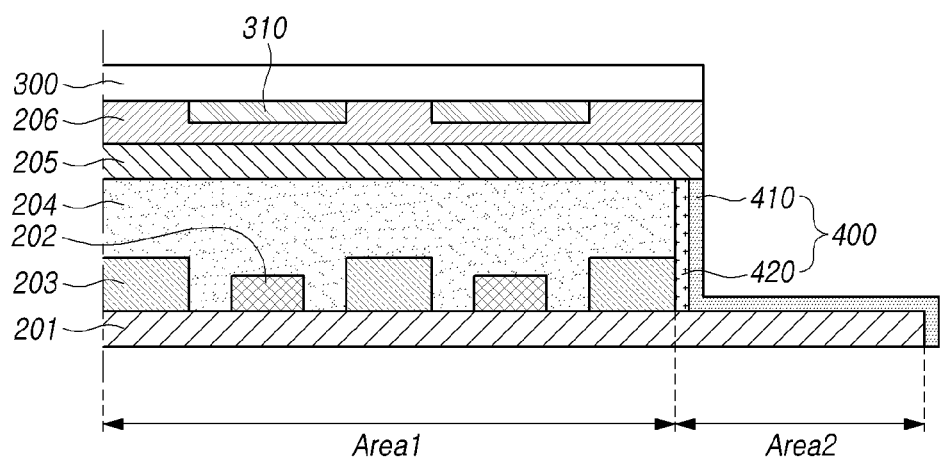
FIG. 3 is a diagram illustrating an example of the structure of the printed circuit protection portion disposed in the printed circuit included in the backlight unit according to aspects of the present disclosure.

FIG. 3 is a diagram illustrating an example of the structure of the printed circuit protection portion 400 disposed in the printed circuit 201 included in the backlight unit according to aspects of the present disclosure.

Referring to FIG. 3, the printed circuit 201 may include a first area (Area 1) in which the plurality of light sources 202 and the reflection plate 203 are arranged and a second area (Area 2) located outside the first area (Area 1).

That is, the first area (Area 1) of the printed circuit 201 is an area where a configuration for supplying light to the display panel 110 is disposed, and may be an effective surface of the printed circuit 201.

The light source protection portion 204 may be disposed on the plurality of light sources 202 and the reflection plate 203, and various optical elements or optical sheets such as a protection film 205 may be disposed on the light source protection portion 204.

Here, the printed circuit protection portion 400 may be disposed in the second area (Area 2) of the printed circuit 201.

The printed circuit protection portion 400 may be disposed on a side surface of the light source protection portion 204. In addition, the printed circuit protection portion 400 may be arranged in a structure to cover at least a part of the side surface of the printed circuit 201.

The printed circuit protection portion 400 may include a first protection portion 410 disposed on the outside and made of a first kind of resin, and a second protection portion 410 disposed on at least a part of the inside of the first protection portion 410 and made of a second kind of resin.

The first protection portion 410 may be made of the first kind of resin and may be made of a resin of a different kind from the resin that constitutes the light source protection portion 204. For example, the first protection portion 410 may be made of a fluorine-based resin.

The second protection portion 420 may be disposed at least in a part of the inner side of the first protection portion 410. For example, the second protection portion 420 may be disposed between the first protection portion 410 and the side surface of the light source protection portion 204.

The second protection portion 420 may be made of the second kind of resin and may be made of resin of the same kind as the resin constituting the light source protection portion 204. That is, the second protection portion 204 may be made of a silicone-based resin.

Here, the height of the portion of the printed circuit protection portion 400 disposed on the side surface of the light source protection portion 204 may be the same as the height of the light source protection portion 204. That is, the light source protection portion 204 can be disposed by applying the resin in the state where the printed circuit protection portion 400 is disposed, and the printed circuit protection portion 400 disposed on the side surface of the light source protection portion 204 may function as the partition.

At this case, since the second protection portion 420 of the printed circuit protection portion 400 made of the second kind of resin is disposed inside the partition structure portion, the resin to be applied for disposing the light source protection portion 204 may be contact with the second protection portion 420 of the printed circuit protection portion 400.

Since the second protection portion 420 is made of resin of the same kind as the resin constituting the light source protection portion 204, the adhesive force to the light source protection portion 204 is increased, so that the resin applied to the outer area of the first area (Area 1) of the printed circuit 201 can be uniformly arranged.

Therefore, the light source protection portion 204 can be arranged uniformly in the first area (Area 1) of the printed circuit 201, so that the optical characteristics appearing in the outer area of the first area (Area 1) of the printed circuit 201 can be made uniform.

In addition, since the first protection portion 410 disposed outside the printed circuit protection portion 400 is made of a resin of a different type from the resin constituting the light source protection portion 204, so that it is possible to prevent the second area (Area 2) of the printed circuit 201 from being contaminated by the residual resin in the process of disposing the light source protection portion 204.

That is, the resin falling into the second area (Area 2) of the printed circuit 201 in the process of applying the resin to the inside of the partition structure of the printed circuit protection portion 400 can be easily removed, so that it is possible to prevent contamination of the second area (Area 2) of the printed circuit 201 and to prevent the assembling failure of the backlight unit or the like.

The optical element or optical sheet such as a protection film 205, a light shielding sheet 300 or the like may be disposed above the portion of the printed circuit protection portion 400 disposed on the side surface of the light source protection portion 204.

Therefore, the printed circuit protection portion 400 may have a function of supporting various sheets disposed on the light source protection portion 204, and various sheets disposed on the light source protection portion 204 may be disposed up to outside of the light source protection portion 204 so as to improve the optical characteristics in the boundary area of the light source protection portion 204.

As described above, the printed circuit protection portion 400 disposed in the second area (Area 2) of the printed circuit 201 may improve the uniformity of the light source protection portion 204 and may facilitate the arrangement of various sheets, so that the optical characteristics of the backlight unit can be improved.

Also, since the second area (Area 2) of the printed circuit 201 may be protected, so that it is possible to prevent the contamination of the printed circuit 201 during the manufacturing process of the backlight unit and the defects caused by the contamination.

Meanwhile, in the printed circuit protection portion 400 disposed in the second area (Area 2) of the printed circuit 201, the first protection portion 410 and the second protection portion 420 may be formed as a double layer as a whole for easy of processing.

Figure 4:
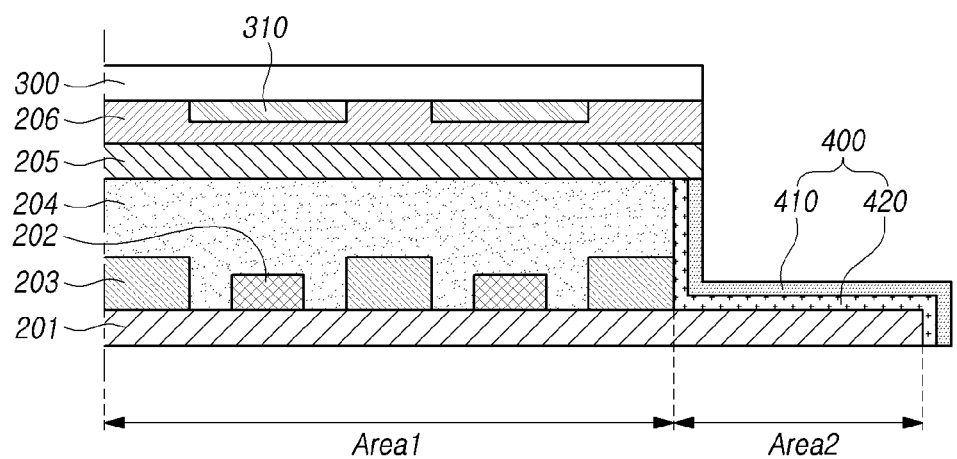
FIG. 4 is a diagram illustrating another example of the structure of the printed circuit protection portion disposed in the printed circuit included in the backlight unit according to the aspects of the present disclosure.

FIG. 4 is a diagram illustrating another example of the structure of the printed circuit protection portion 400 disposed in the printed circuit 201 included in the backlight unit according to the aspects of the present disclosure.

Referring to FIG. 4, the plurality of light sources 202 and reflection plates 203 may be disposed in the first area (Area 1) of the printed circuit 201.

The printed circuit protection portion 400 may be disposed in the second area (Area 2) of the printed circuit 201.

The printed circuit protection portion 400 may be disposed on a side surface of the light source protection portion 204. In addition, the printed circuit protection portion 400 may be disposed at least a part of the side surface of the printed circuit 201.

The printed circuit protection portion 400 may include the first protection portion 410 disposed on the outside and made of the first kind of resin, and the second protection portion 420 disposed on the inner side of the first protection portion 410 and made of the second kind of resin.

Here, the second protection portion 420 may be disposed between the first protection portion 410 and the side surface of the light source protection portion 204. In addition, the second protection portion 420 may be disposed between the first protection portion 410 and the printed circuit 201.

That is, the first protection portion 410 and the second protection portion 420 may have a double layer structure as a whole.

Therefore, the resin of the first kind and the resin of the second kind are bonded by an adhesive material or the like and then the structure for placing on the printed circuit 201 is formed, the printed circuit protection portion 400 can be easily manufactured.

Alternatively, the printed circuit protection portion 400 may be easily manufactured by bonding the resin of the first kind and the resin of the second kind which are formed in the same manner to be disposed on the printed circuit 201 with an adhesive material or the like.

Therefore, in the printed circuit protection portion 400 having the double layer structure of the first protection portion 410 and the second protection portion 420, the second protection portion 420 is disposed on the side surface of the light source protection portion 204 so that the arrangement of the light source protection portion 204 composed of the same kind of resin as that of the second protection portion 420 can be uniform.

Since the resin of the first kind is disposed outside the printed circuit protection portion 400, it is possible to prevent the resin constituting the light source protection portion 204 from remaining in the second area (Area 2) of the printed circuit 201.

The printed circuit protection portion 400 may be formed as a frame shape and disposed in the printed circuit 201, for example.

Figure 5:
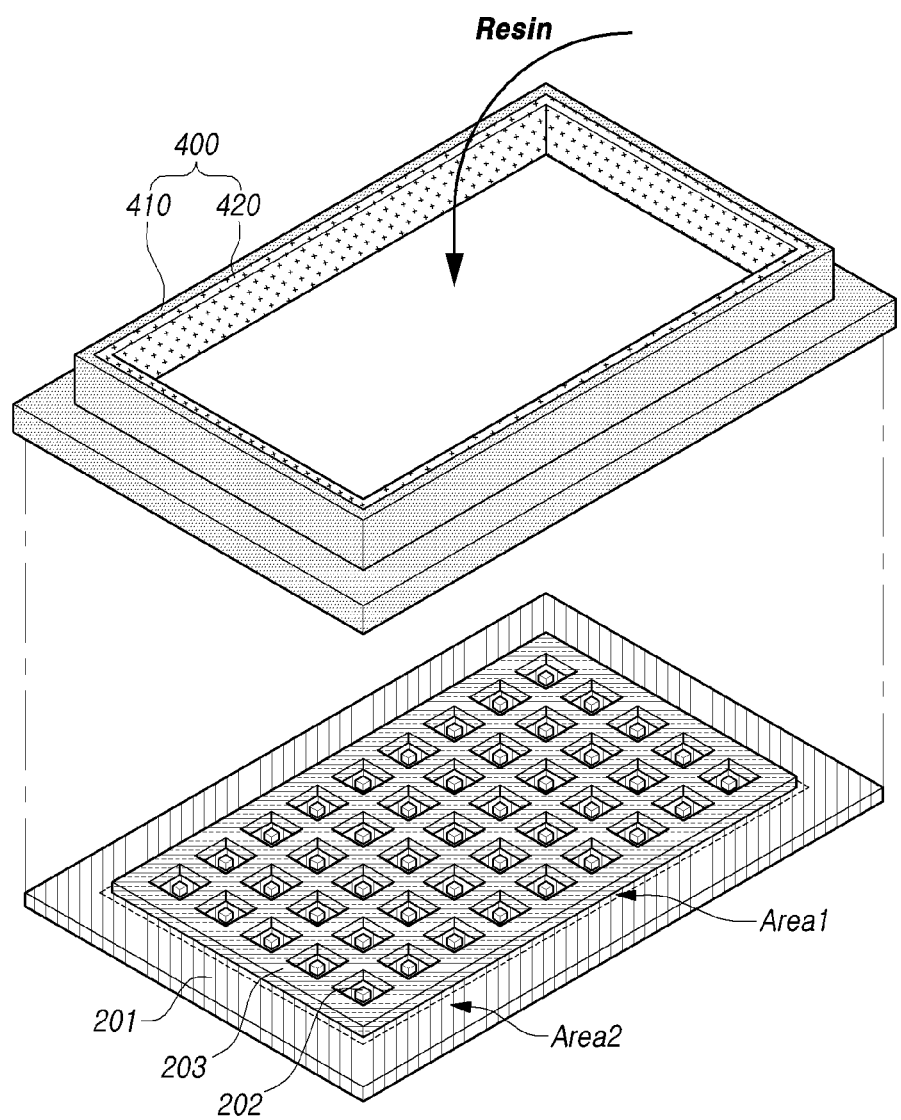
FIG. 5 is a diagram illustrating an example of a manner in which the printed circuit protection portion shown in FIG. 4 is arranged in the printed circuit.

FIG. 5 is a diagram illustrating an example of a manner in which the printed circuit protection portion 400 shown in FIG. 4 is arranged in the printed circuit 201.

Referring to FIG. 5, the plurality of light sources 202 may be arranged in the first area (Area 1) of the printed circuit 201. The reflection plate 203 may be disposed in an area where the light source is not disposed in the first area (Area 1) of the printed circuit 201.

That is, the reflection plate 203 may be the structure in which a region corresponding to the light source 202 is opened. The reflection plate 203 may be disposed on the first area (Area 1) of the printed circuit 201 on which the light source 202 is mounted.

The printed circuit protection portion 400 may be disposed on the printed circuit 201 on which the light source 202 and the reflection plate 203 are disposed.

In the printed circuit protection portion 400, the first protection portion 410 disposed on the outer side may be made of resin of the first kind, and the second protection portion 420 disposed on the inner side may be made of the resin of the second kind.

The printed circuit protection portion 400 may include a portion corresponding to the partition structure, a portion disposed in the second area (Area 2) of the printed circuit 201, and a portion surrounding the side surface of the printed circuit 201.

Accordingly, the printed circuit protection portion 400 may be disposed on the printed circuit 201 in such a manner as to be inserted into the printed circuit 201.

That is, the portion of the printed circuit protection portion 400 that surrounds the side surface of the printed circuit 201 can function to fix the printed circuit protection portion 400 on the printed circuit 201.

In addition, the light source protection portion 204 may be formed by applying the resin to the first area (Area 1) of the printed circuit 201 in a state that the printed circuit protection portion 400 is disposed on the printed circuit 201.

Since the inner side of the portion corresponding to the partition structure of the printed circuit protection portion 400 is made of the same kind of resin as the resin constituting the light source protection portion 204, the adhesive force between the light source protection portion 204 and the printed circuit protection portion 400 can be increased.

Therefore, the light source protection portion 204 can be uniformly arranged in the outer area of the first area (Area 1) of the printed circuit 201.

The resin falling into the second area (Area 2) of the printed circuit 201 in the process of forming the light source protection portion 204 can be easily removed by the first protection portion 410 of the printed circuit protection portion 400 which is made of a different kind of resin.

Since a sufficient amount of resin should be applied to the first area (Area 1) of the printed circuit 201 for constituting the light source protection portion 204, there may be a possibility that the resin applied to the first area (Area 1) overflows.

In this case, a structure for discharging a small amount of overflowing resin may be formed in the portion corresponding to the partition structure of the printed circuit protection portion 400.

Figure 6:
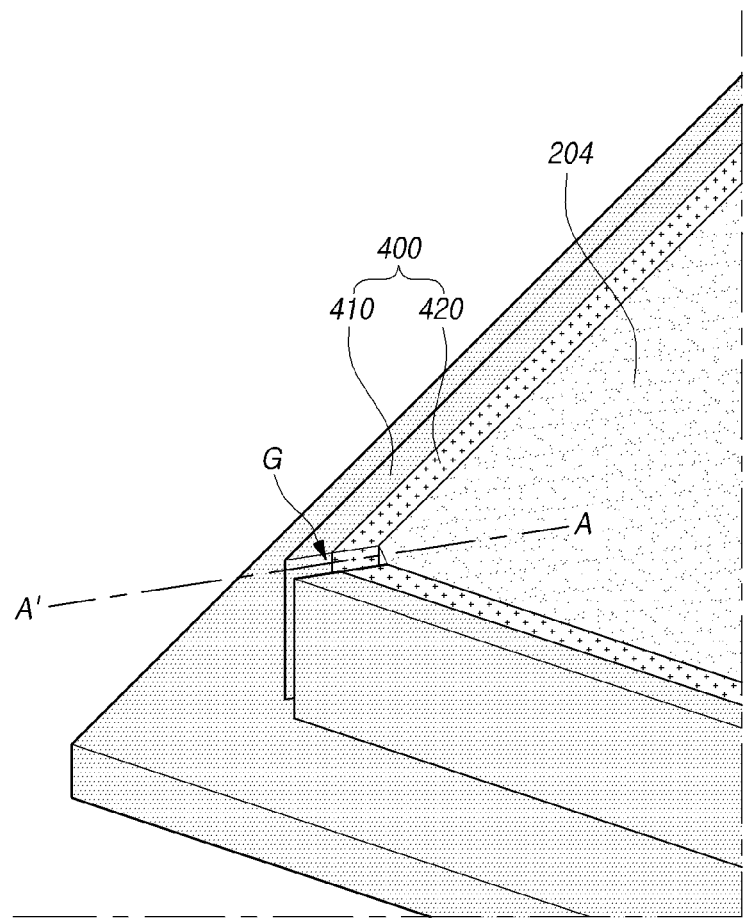
FIG. 6 is a diagram illustrating an example of the structure in which grooves are included in the printed circuit protection portion shown in FIG. 4.

FIG. 6 is a diagram illustrating an example of the structure in which grooves (G) are included in the printed circuit protection portion 400 shown in FIG. 4.

Referring to FIG. 6, the portion of the printed circuit protection portion 400 disposed on the side surface of the light source protection portion 204 may include at least one groove (G).

For example, the groove (G) may be disposed in the printed circuit protection portion 400 disposed at the corner of the light source protection portion 204. These grooves (G) may be disposed at each of the corner portions of the light source protection portion 204.

Alternatively, at least one groove (G) may be disposed at a predetermined interval in the printed circuit protection portion 400 disposed at the corner of the light source protection portion 204.

The groove (G) may be formed in a shape recessed from the upper side in a direction perpendicular to the printed circuit 201 in the portion in which the printed circuit protection portion 400 is disposed in the side surface of the light source protection portion 204.

The structure in which at least one of the first protection portion 410 and the second protection portion 420 is exposed may be formed on the lower surface of the groove (G).

That is, even if the grooves (G) are disposed in the printed circuit protection portion 400, the first protection portion 410 and the second protection portion 420 may be disposed on the lower surface of the groove (G) to prevent the second area (Area 2) of the printed circuit 201 from being exposed.

As described above, at least one groove (G) is arranged in the printed circuit protection portion 400 disposed on the side surface of the light source protection portion 204, so that a small amount of overflowing resin can be discharged in the process of applying the resin constituting the light source protection portion 204

Since the discharged resin is disposed on the first protection portion 410 of the printed circuit protection portion 400, the discharged resin can be easily removed.

The structure of the groove (G) disposed in the printed circuit protection portion 400 can be implemented in various forms.

Figure 7A:
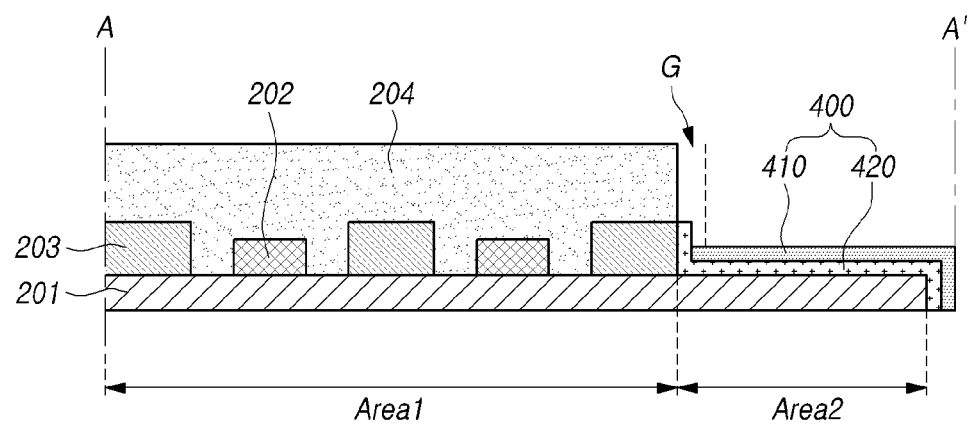
FIGS. 7A and 7B are diagrams illustrating examples of a cross-sectional structure of portion A-A' shown in FIG. 6.
Figure 7B:
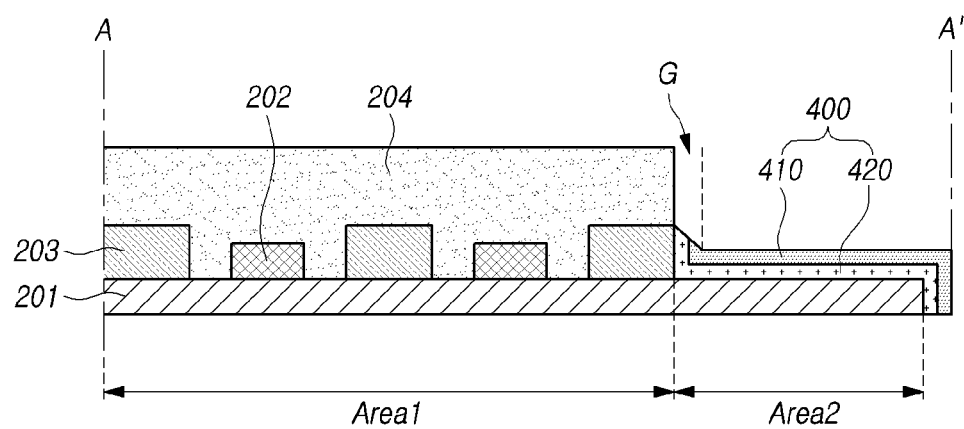

FIGS. 7A and 7B are diagrams illustrating examples of a cross-sectional structure of portion A-A' shown in FIG. 6.

Referring to FIG. 7A, the plurality of light sources 202 and the reflection plate 203 may be arranged in a first area (Area 1) of the printed circuit 201, and the light source protection portion 204 may be arranged on the light source 202 and the reflection plate 203.

The printed circuit protection portion 400 may be disposed in the second area (Area 2) of the printed circuit 201, and at least one portion in the printed circuit protection portion 400 disposed on the side surface of the light source protection portion 204 may include at least one groove (G).

The groove (G) may be, for example, a stepped shape in which the height thereof decreases from the first area (Area 1) of the printed circuit 201 toward the second area (Area 2) of the printed circuit 201.

That is, in the groove (G) of the printed circuit protection portion 400, the height of the second protection portion 420 adjacent to the light source protection portion 204 may be larger than the height of the first protection portion 410.

A small amount of overflowing resin may be discharged in the process of constructing the light source protection portion 204 through the groove (G) with the stepped shape structure.

Referring to FIG. 7B, at least one groove (G) disposed in the printed circuit protection portion 400 may be formed in a form inclined in the direction from the first area (Area 1) of the printed circuit 201 toward the second area (Area 2) of the printed circuit 201.

That is, in the groove (G) of the printed circuit protection portion 400, the upper surfaces of the first protection portion 410 and the second protection portion 420 may be inclined.

With this inclined structure, it is possible to facilitate the discharge of the overflowing resin in the process of disposing the light source protection portion 204.

Alternatively, in the printed circuit protection portion 400, only the second protection portion 420 adjacent to the side surface of the light source protection portion 204 may include the groove (G).

Figure 8:
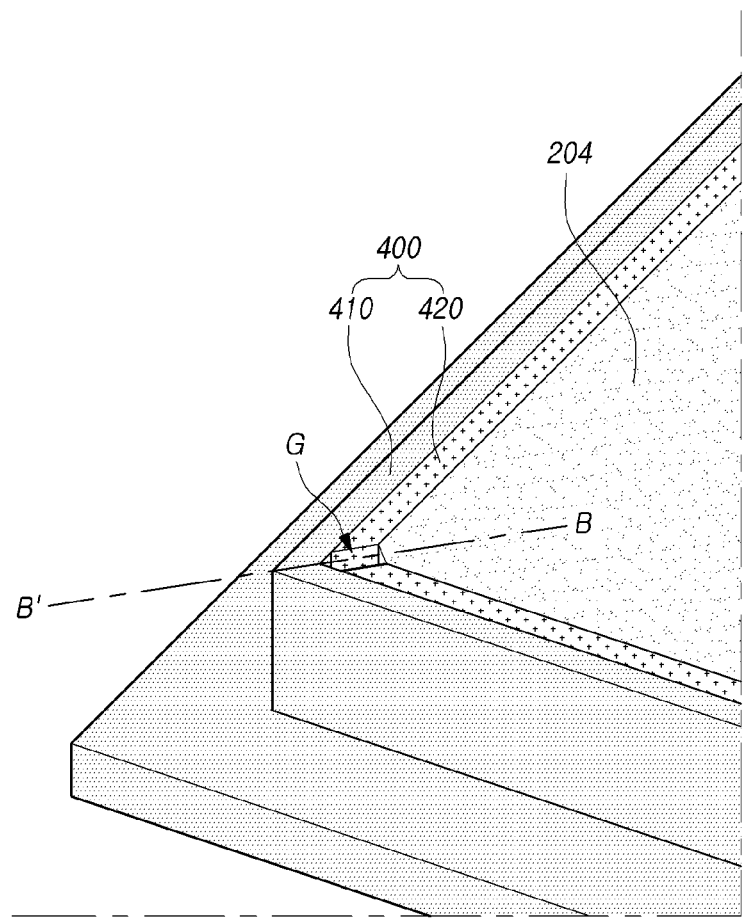
FIG. 8 is a diagram illustrating another example of the structure in which grooves are included in the printed circuit protection portion shown in FIG. 4.

FIG. 8 is a diagram illustrating another example of the structure in which grooves (G) are included in the printed circuit protection portion 400 shown in FIG. 4.

Referring to FIG. 8, the second protection portion 420 of the printed circuit protection portion 400 may include at least one groove (G) in a portion disposed on the side surface of the light source protection portion 204.

The groove (G) may be formed in a shape recessed from the upper side in a direction perpendicular to the printed circuit 201 in the portion in which the printed circuit protection portion 400 is disposed in the side surface of the light source protection portion 204.

The second protection portion 420 may remain on the bottom surface of the groove (G) so that the second area (Area 2) of the printed circuit 201 located below the second protection portion 420 cannot be exposed.

Here, the height of the first protection portion 410 disposed in the region corresponding to the horizontal direction of the region where the groove (G) is disposed in the second protection portion 420 may be equal to the height of the light source protection portion 204.

That is, the first protection portion 410 disposed in the region corresponding to the groove (G) of the second protection portion 420 may not include the groove (G).

Therefore, a small amount of resin overflowing in the process of disposing the light source protection portion 204 may be allowed to remain in the groove (G) formed in the second protection portion 420 of the printed circuit protection portion 400, so that it is possible to prevent the resin from overflowing to the outside of the printed circuit protection portion 400.

Figure 9:
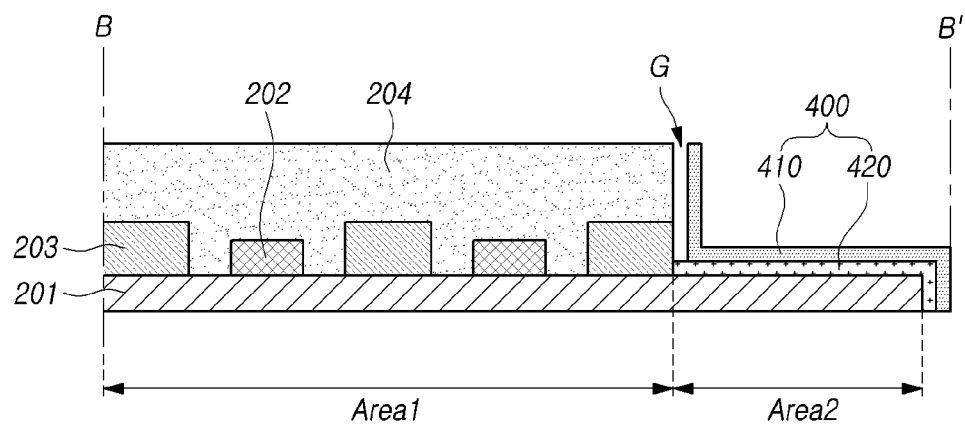
FIG. 9 is a diagram illustrating an example of a cross-sectional structure of portion B-B' shown in FIG. 8.

FIG. 9 is a diagram illustrating an example of a cross-sectional structure of a portion B-B' shown in FIG. 8.

Referring to FIG. 9, the plurality of light sources 202 and reflection plates 204 may be arranged in the first area (Area 1) of the printed circuit 201. The light source protection portion 204 may be disposed on the light source 202 and the reflection plate 204.

The printed circuit protection portion 400 may be disposed in the second area (Area 2) of the printed circuit 201.

Here, the portion of the second protection portion 420 of the printed circuit protection portion 400, which is disposed on the side surface of the light source protection portion 204, may include at least one groove (G). The grooves (G) included in the second protection portion 420 may be arranged so as not to expose the second area (Area 2) of the printed circuit 201.

The first protection portion 410 corresponding to the portion where the groove (G) is disposed in the second protection portion 420 may not include the groove (G).

The first protection portion 410 may be disposed at the same height as the light source protection portion 204.

As described above, the structure in which the groove (G) is formed only in the second protection portion 420 disposed inside the printed circuit protection portion 400 is provided, so that a small amount of resin overflowing in the process of disposing the light source protection portion 204 may remain in the groove (G). Therefore, the resin can be prevented from overflowing to the outside.

Figure 10:
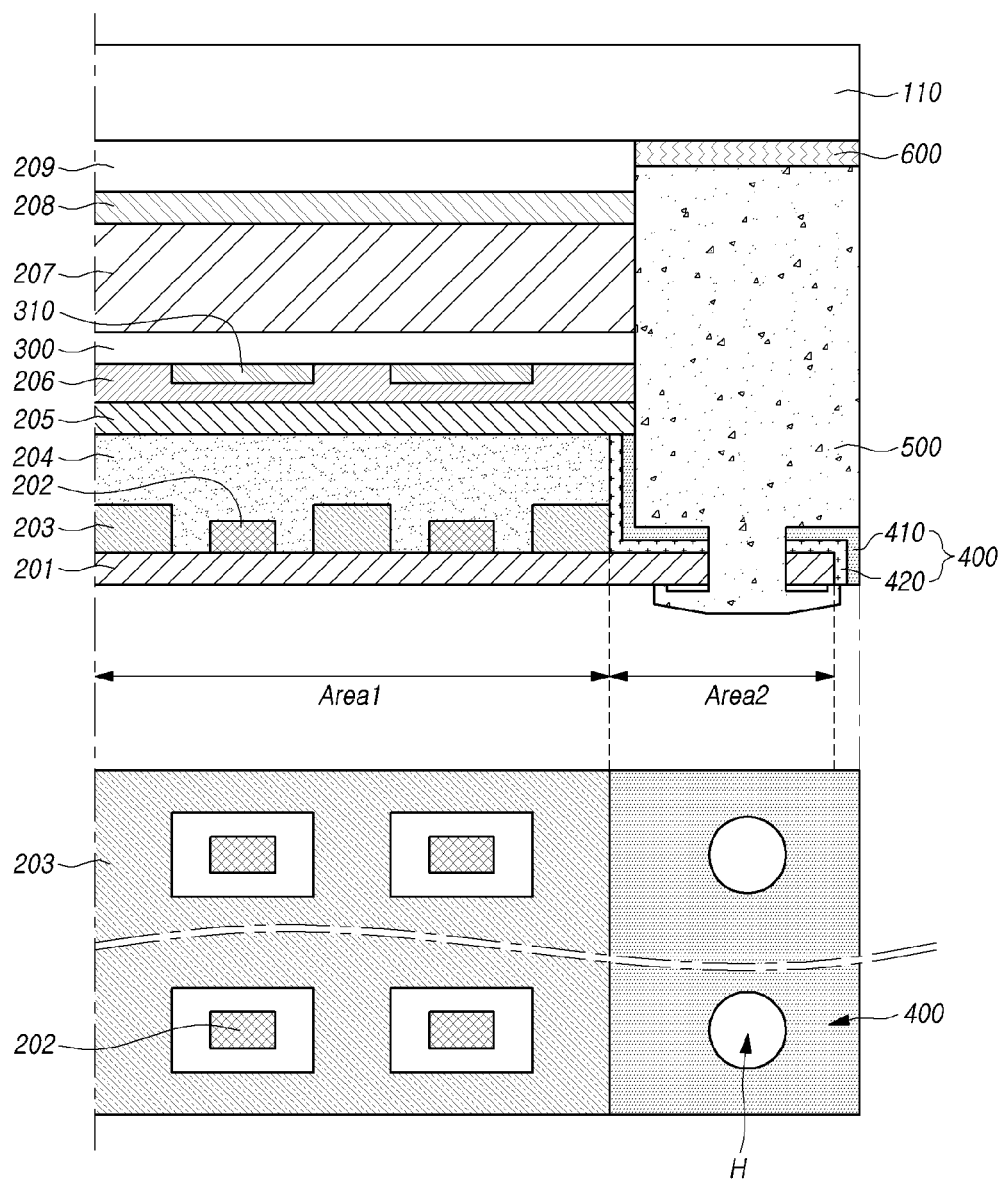
FIG. 10 is a diagram illustrating an example of a structure in which the display panel is disposed on the backlight unit including the printed circuit protection portion according to aspects of the present disclosure.

FIG. 10 is a diagram illustrating an example of a structure in which the display panel 110 is disposed on the backlight unit including the printed circuit protection portion 400 according to aspects of the present disclosure.

Referring to FIG. 10, the plurality of light sources 202 and the reflection plate 203 may be arranged in the first area (Area 1) of the printed circuit 201 and the light source protection portion 204 may be arranged on the light source 202 and the reflection plate 203.

The printed circuit protection portion 400 may be disposed in the second area (Area 2) of the printed circuit 201. The printed circuit protection portion 400 may be disposed on the side surface of the light source protection portion 204, or may be disposed on the side surface of the printed circuit 201.

The protection film 205, the light shielding sheet 300, the diffusion plate 207, the phosphor sheet 208 and the optical sheet 209 may be arranged on the light source protection portion 204 and the portion of the printed circuit protection portion 400 disposed on the side surface of the light source protection portion 204.

At this case, the support member 500 may be disposed on the upper surface of the printed circuit protection portion 400 in the second area (Area 2) of the printed circuit 201.

The support member 500 can be fastened by the holes (H) formed in the printed circuit 201 and the printed circuit protection portion 400. The side surface of the support member 500 can support the side surfaces of the plurality of sheets disposed on the light source protection portion 204.

In addition, the upper surface of the support member 500 may support the display panel 110. Here, the adhesive tape 600 may be disposed between the upper surface of the support member 500 and the display panel 110.

As described above, the arrangement area of the various sheets may be widened through the portion disposed on the side surface of the light source protection portion 204 in the printed circuit protection portion 400, and the various sheets and the display panel 110 can be fixed by the support member 500 fastened to the second area (Area 2) of the printed circuit 201.

According to the aspects of the present disclosure described above, in the direct type backlight unit, the light source protection portion 204 and the light shielding pattern 310 and the like are disposed on the light source 202 arranged in the first area (Area 1) of the printed circuit 201, so that it is possible to prevent the occurrence of hot spots in the area where the light source 202 is disposed and to improve the image quality of the backlight unit by increasing the luminance uniformity.

In addition, in the printed circuit protection portion 400 disposed in the second area (Area 2) of the printed circuit 201, the second protection portion 420 made of resin of the same kind as the resin constituting the light source protection portion 204 is disposed inside the portion disposed on the side surface of the light source protection portion 204, so that the light source protection portion 204 can be easily disposed in the first area (Area 1) of the printed circuit 201.

In addition, the first protection portion 410 made of a resin different from the resin constituting the light source protection portion 204 is disposed outside of the printed circuit protection portion 400, so that it is possible to prevent the contamination of the printed circuit 201 due to the residual resin in the process of constructing the light source protection portion 204 and the defective assembling due to the contamination.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A display device comprising:
a display panel that displays an image; and
a backlight unit that supplies light to the display panel, wherein the backlight unit comprises:
a printed circuit having a first area and a second area;
a plurality of light sources arranged in the first area;
a reflection plate disposed in at least one area between the plurality of light sources arranged in the first area;

a light source protection portion disposed on the plurality of light sources and the reflection plate in the first area; and a printed circuit protection portion disposed on a side surface of the light source protection portion and on an upper surface of the printed circuit in the second area of the printed circuit, and the printed circuit protection portion surrounding at least a part of a side surface of the printed circuit wherein the printed circuit protection portion comprises:

a first protection portion made of a first resin; and a second protection portion disposed between the first protection portion and the side surface of the light source protection portion and made of a second resin, wherein a portion of the printed circuit protection portion facing the side surface of the light source protection portion includes at least one groove recessed in a direction perpendicular to the printed circuit, wherein the at least one groove has a step shape in which a height decreases from the first area of the printed circuit toward the second area of the printed circuit, or is inclined in a direction from the first area of the printed circuit toward the second area of the printed circuit.

2. The display device of claim 1, wherein the second protection portion is further disposed between the first protection portion and the printed circuit.

3. The display device of claim 1, wherein the light source protection portion is made of a same kind of resin as the second protection portion.

4. The display device of claim 1, wherein the second protection portion includes the at least one groove recessed in a direction perpendicular to the printed circuit, and wherein a height of the first protection portion disposed in the region corresponding to the at least one groove in a horizontal direction is equal to a height of the light source protection portion.

5. The display device of claim 1, further comprising a protection film disposed on the light source protection portion and the portion of the printed circuit protection portion disposed on a side surface of the light source protection portion.

6. The display device of claim 5, further comprising a light shielding sheet disposed on the protection film, wherein the light shielding sheet includes a plurality of light shielding patterns disposed on a surface of the light shielding sheet and disposed at positions corresponding to each of the plurality of light sources.

7. The display device of claim 6, further comprising an adhesive layer disposed between the protection film and the light shielding sheet and disposed on at least a part of a region excluding a region where the plurality of light shielding patterns are disposed, wherein an air gap is disposed between the protection film and the plurality of light shielding patterns.

8. The display device of claim 5, further comprising a support member which is disposed on the printed circuit protection portion in the second area of the printed circuit, is fastened by holes included in the printed circuit and the printed circuit protection portion, and supports a side surface of the protection film and a lower surface of the display panel.

9. A backlight unit comprising:

a plurality of light sources;

a printed circuit having a first area in which the plurality of light sources are disposed and a second area located outside the first area;

a reflection plate disposed in at least one area between the plurality of light sources arranged in the first area;

a light source protection portion disposed on the plurality of light sources and the reflection plate in the first area; and a printed circuit protection portion disposed on a side surface of the light source protection portion and on an upper surface of the printed circuit in the second area of the printed circuit and surrounding at least a part of aside surface of the printed circuit, wherein the printed circuit protection portion comprising:

a first protection portion made of a first resin; and a second protection portion disposed inside the first protection portion and made of a second resin wherein a portion of the printed circuit protection portion facing the side surface of the light source protection portion includes at least one groove recessed in a direction perpendicular to the printed circuit, wherein the at least one groove has a step shape in which a height decreases from the first area of the printed circuit toward the second area of the printed circuit, or is inclined in a direction from the first area of the printed circuit toward the second area of the printed circuit.

10. The backlight unit of claim 9, wherein the second protection portion includes the at least one groove recessed in a direction perpendicular to the printed circuit, and wherein a height of the first protection portion disposed in the region corresponding to the at least one groove in a horizontal direction is equal to a height of the light source protection portion.

11. A backlight unit comprising:

a plurality of light sources;

a printed circuit including a first area where the plurality of light sources are disposed and a second area horizontally extended from the first area where no light source is disposed;

a reflection plate having a plurality of trenches in the first area accommodating the plurality of light sources;

a light source protection portion covering the plurality of light sources and the reflection plate in the first area; and a printed circuit protection portion disposed on a side surface of the light source protection portion located at a boundary between the first and second areas and extended to an exposed upper surface of the printed circuit in the second area, wherein a portion of the printed circuit protection portion facing the side surface of the light source protection portion includes at least one groove recessed in a direction perpendicular to the printed circuit, wherein the at least one groove has a step shape in which a height decreases from the first area of the printed circuit toward the second area of the printed circuit, or is inclined in a direction from the first area of the printed circuit toward the second area of the printed circuit.

12. The backlight unit of claim 11, wherein the printed circuit protection portion comprising:

a first protection portion disposed on an outer side and made of a first resin; and a second protection portion disposed inside the first protection portion and made of a second resin.

13. The backlight unit of claim 12, wherein the second protection portion includes the at least one groove recessed in a direction perpendicular to the printed circuit, and wherein a height of the first protection portion disposed in the region corresponding to the at least one groove in a horizontal direction is equal to a height of the light source protection portion.

14. The backlight unit of claim 11, further comprising a protection film disposed on the light source protection portion and the portion of the printed circuit protection portion disposed on a side surface of the light source protection portion.

15. The backlight unit of claim 14, further comprising a light shielding sheet disposed on the protection film,
wherein light shielding sheet includes a plurality of light shielding patterns disposed on a surface of the light shielding sheet and disposed at positions corresponding to each of the plurality of light sources.

16. The backlight unit of claim 15, further comprising an adhesive layer disposed between the protection film and the light shielding sheet and disposed on at least a part of a region excluding a region where the plurality of light shielding patterns are disposed,
wherein an air gap is disposed between the protection film and the plurality of light shielding patterns.

17. The backlight unit of claim 14, further comprising a support member which is disposed on the printed circuit protection portion disposed in the second area of the printed circuit, is fastened by holes included in the printed circuit and the printed circuit protection portion, and supports a side surface of the protection film.

\* \* \* \* \*